United States Patent [19]

Rudnick

[11] Patent Number: 4,890,229

[45] Date of Patent: Dec. 26, 1989

[54] ELECTRONIC BASEBALL CARD

[75] Inventor: Paul J. Rudnick, Castro Valley, Calif.

[73] Assignee: Psicom Sports Incorporated, Dublin, Calif.

[21] Appl. No.: 158,193

[22] Filed: Feb. 19, 1988

[51] Int. Cl.$^4$ .............................................. G06F 15/40
[52] U.S. Cl. ...................................... 364/410; 273/88
[58] Field of Search .................. 364/410, 411; 273/88, 273/25

[56] References Cited

U.S. PATENT DOCUMENTS

| | | | |
|---|---|---|---|
| 4,382,280 | 5/1983 | Mandel et al. ...................... | 364/412 |
| 4,395,760 | 7/1983 | Soski et al. .......................... | 364/410 |
| 4,672,541 | 6/1987 | Bromley et al. .................... | 364/410 |

Primary Examiner—David M. Malzahn
Attorney, Agent, or Firm—Townsend and Townsend

[57] ABSTRACT

A small hand-held electronic device that contains all of the normally interesting statistics for a baseball player or team. The user interface comprises a visual display and a keyboard having alphabet keys, an ENTER key, cursor keys for scrolling, and statistic keys for selecting the statistic of interesting. The system electronics includes a microprocessor and a large solid state non-volatile memory array containing the detailed statistical records of hundreds of baseball players. The user turns on the device and selects a player or team by entering two or three characters of the name via the alphabet keys. A series of choices are displayed on the screen and the user scrolls through the list using the cursor keys (up and down). When the desired player or team is displayed, the user presses the appropriate statistic key. The device displays the cumulative statistics; previous year statistics are displayed by the use of the cursor keys. A new statistic may be obtained by pressing the key corresponding to that statistic while a new player or team may be selected by depressing the first two or three letters of the name and beginning the process anew.

4 Claims, 7 Drawing Sheets

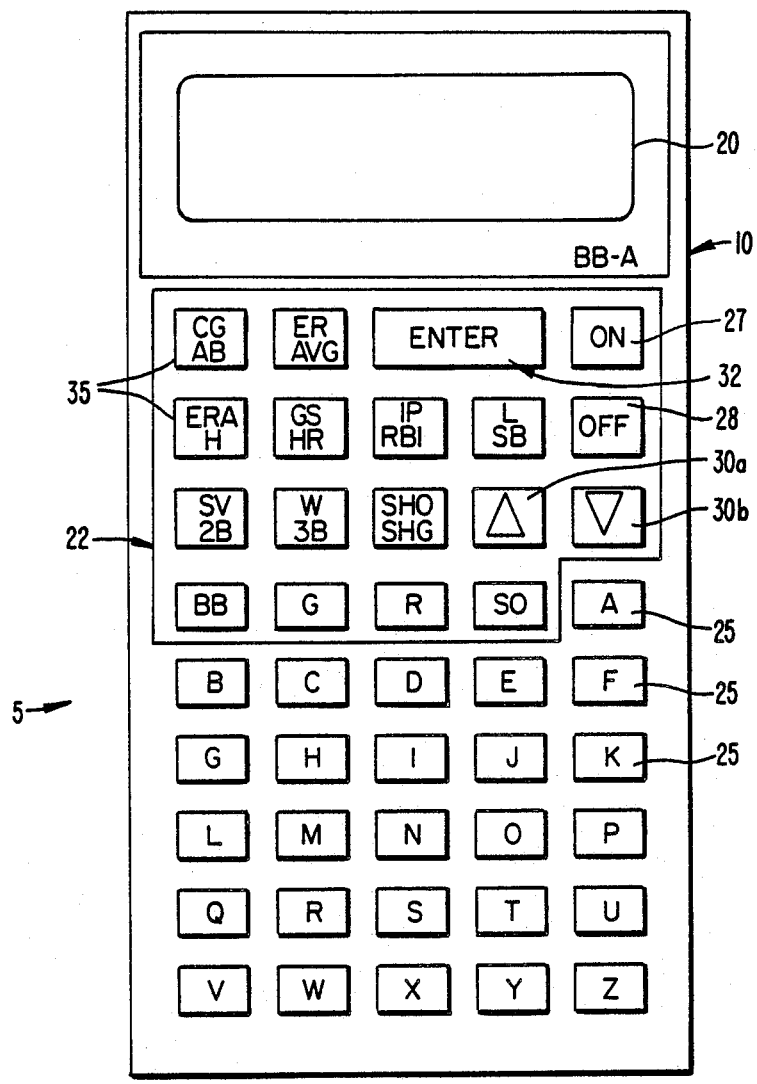
FIG._1.

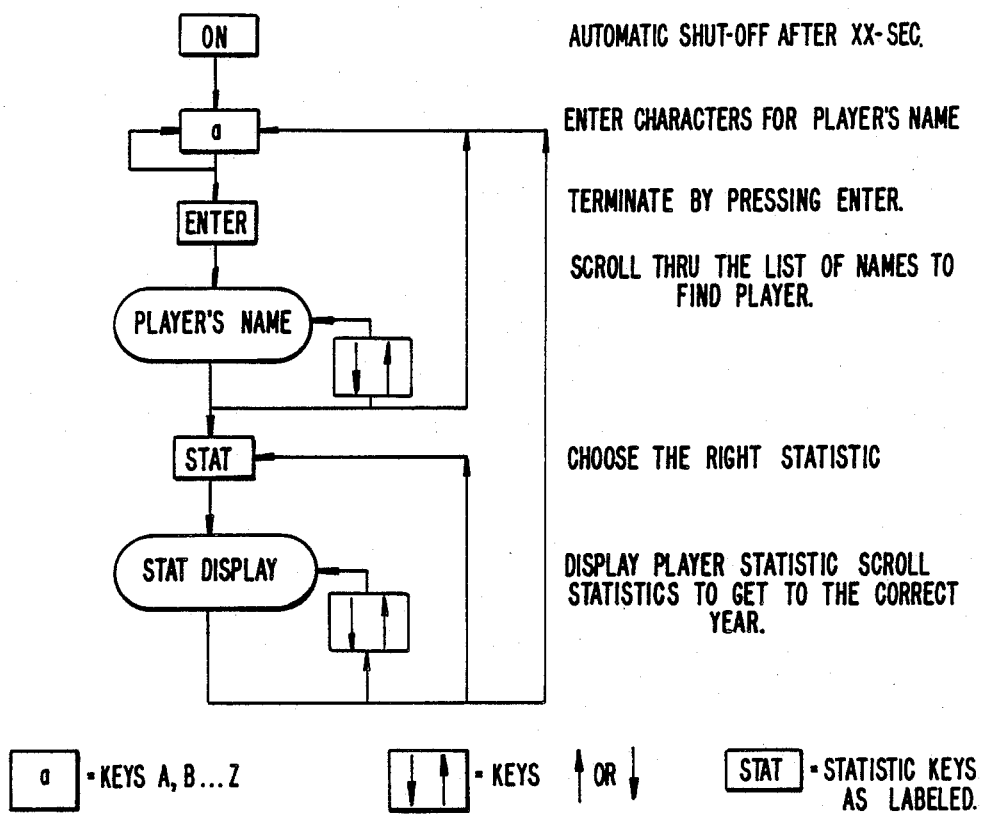
FIG._2.

PSICOM SPORTS
SELECT A PLAYER

FIG._3A.

HEE_

FIG._3B.

HEEP, DANNY?

FIG._3C.

HEEP, DANNY
87N LA B .163AVG

FIG._3D.

PEREZ, PASCUAL
87N MO P 2.30ERA

FIG._3E.

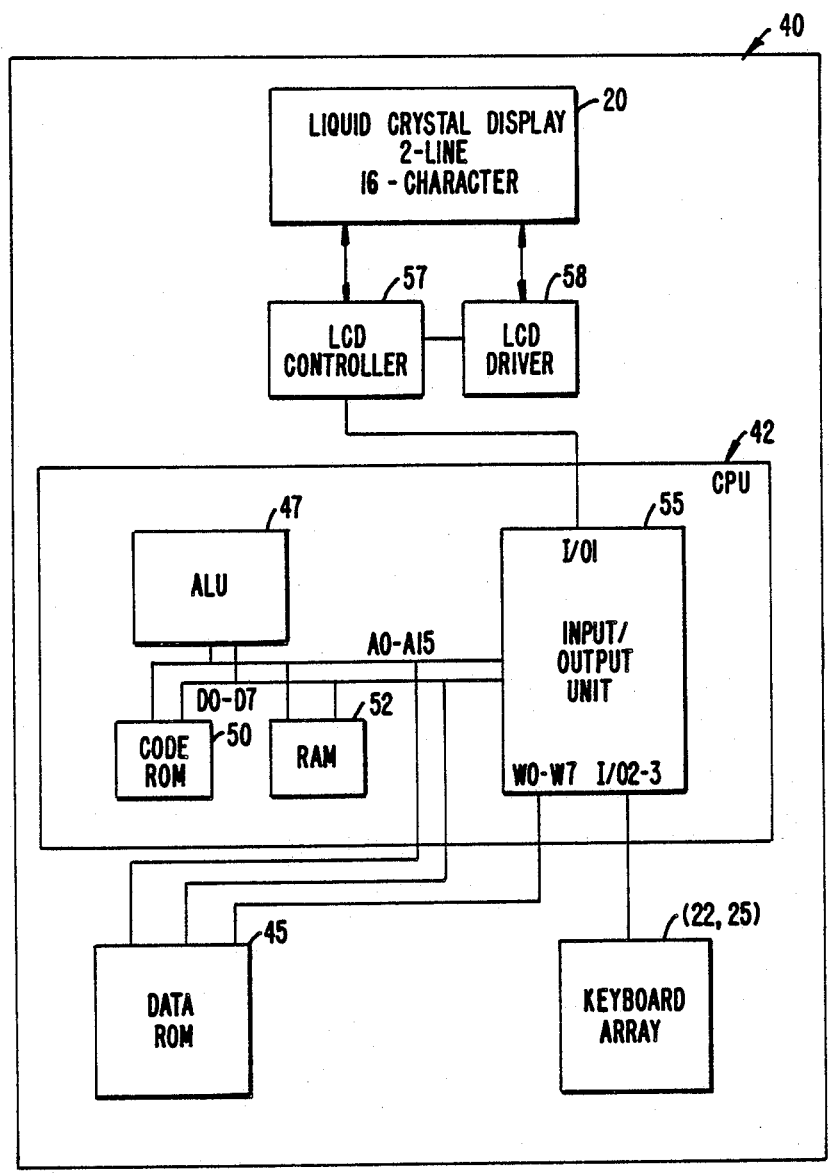
FIG._4A.

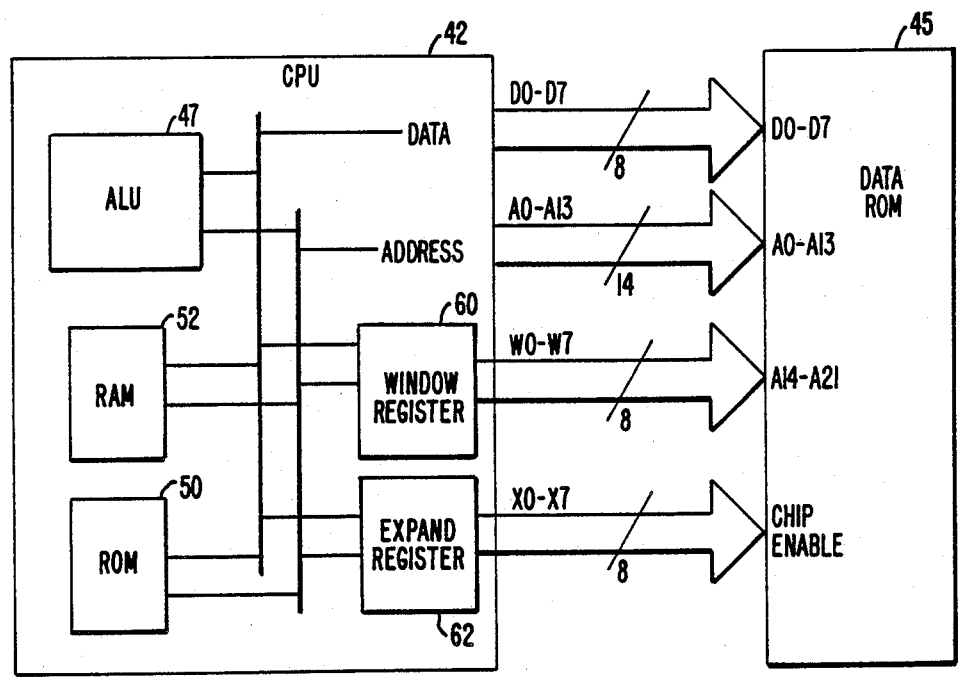
FIG._4B.

PLAYER 1
- HEADER RECORD
- CUMULATIVE RECORD
- YEAR RECORD 1
- YEAR RECORD 2
- YEAR RECORD 3 rHEEP,DANNYmBLL070357
r62014111513547552515810364161185251
r870609098071604000912040810163
...

PLAYER 2
- HEADER RECORD
- CUMULATIVE RECORD
- YEAR RECORD 1
- YEAR RECORD 2
- YEAR RECORD 3

...

PLAYER 3
- HEADER RECORD
- CUMULATIVE RECORD
- YEAR RECORD 1
- YEAR RECORD 2
- YEAR RECORD 3 rPEREZ,PASCUALmPRR051757
r13077043413683234862281211520378
r87100701070021180581610200230
r85220951011372650575722000614
...

PLAYER 4
- HEADER RECORD
- CUMULATIVE RECORD
- YEAR RECORD 1
- YEAR RECORD 2
- YEAR RECORD 3

[where r is record type, m is a marker, numbers are in binary coded decimal, and stats are in the following order:
Pitchers:
g ip w l r er so bb gs cg sho sv era
Batters:
g ab r h 2b 3b hr rbi sb slg bb so avg]

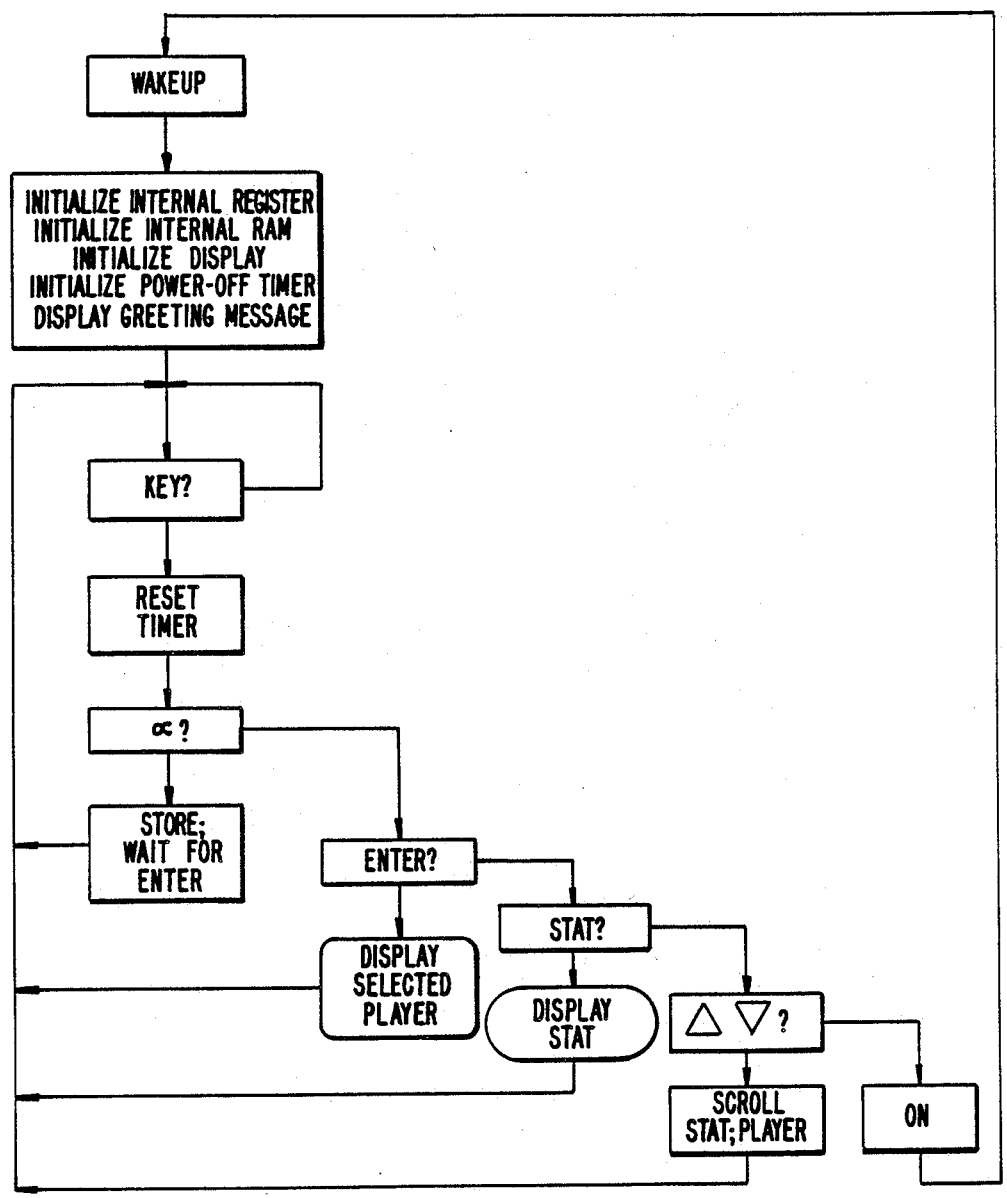
FIG._6.

ELECTRONIC BASEBALL CARD

FIELD OF THE INVENTION

The invention relates to the preparation, storage, and retrieval of statistical information related to sports, and more particularly to a handheld, calculator-like electronic device that allows a user to retrieve desired information regarding baseball players and teams.

BACKGROUND OF THE INVENTION

Historic and statistical data relating to the past performance of major league baseball players and their teams represent an important, if not crucial part of the baseball experience. Such statistics are typically available in reference books devoted to the subject or on baseball cards. With a reference book, the user typically searches for the desired information by referring to an index or table of contents, or by thumbing through the reference book until the desired player's table of statistics is found. The typical table of statistics contains 13-26 parameters for each year of a player's professional career, which makes the process of searching for a particular statistic (e.g. "bases on balls" in 1986 for a specific player) a tedious one. In using baseball cards, the user is at the mercy of his or her previous organization, which may or may not be a problem.

A further problem with prior art methods of retrieving baseball statistics is that they are not well suited to real time use in the field (i.e. at the baseball game). The reference books and baseball card collections tend to be large and difficult to carry. Moreover, few collectors are willing to risk their prized baseball card collections in the sometimes harsh environment of the baseball stadium.

Thus, the baseball fan is usually relegated to bringing along a portable radio and gleaning whatever statistical facts the radio announcer considers of interest.

SUMMARY OF THE INVENTION

The present invention provides a small hand-held electronic device that contains all of the normally interesting statistics for a baseball player or team. The user interface comprises a visual display and a keyboard having alphabet and function keys. The function keys include an ENTER key, cursor keys for scrolling, and statistic keys for selecting the statistic of interest.

Internally, the system electronics includes a microprocessor and a large solid state non-volatile memory array containing the detailed statistical records of hundreds of baseball players. The preparation of the database entails the removal of redundant information and the computation and organization of all statistics of interest.

In a preferred embodiment, the user turns on the device and selects a player or team by entering two or three characters of the name via the alphabet keys. A series of choices are displayed on the screen and the user scrolls through the list using the cursor keys (up and down). When the desired player or team is displayed, the user presses the appropriate statistic key. The device displays the cumulative statistics; previous year statistics are displayed by the use of the cursor keys. A new statistic may be obtained by pressing the key corresponding to that statistic while a new player or team may be selected by depressing the first two or three letters of the name and beginning the process anew.

A further understanding of the nature and advantages of the present invention may be realized by reference to the remaining portions of the specification and the attached drawings.

BRIEF DESCRIPTION OF THE DRAWINGS

FIG. 1 is a pictorial representation of a preferred embodiment of the invention;

FIG. 2 is a flow diagram illustrating the operation of the invention from the user's viewpoint;

FIGS. 3A-E illustrate various screen displays;

FIGS. 4A-B are block diagrams of the electronic circuitry;

FIGS. 5A-B illustrate the organization of the statistical database; and

FIG. 6 is a flow diagram of the system software.

DESCRIPTION OF THE PREFERRED EMBODIMENTS

Overview

FIG. 1 is a pictorial representation of a hand-held device 5 that allows a user to access desired historical and statistical information for a given baseball player or team. The device comprises a housing 10 within which is located electronic circuitry (not shown) for controlling the operation of the device. A user interface comprises a display device 20 and a series of keys including a set of function keys 22 and a set of alphabet keys 25. The function keys include ON and OFF keys 27 and 28, a pair of cursor keys 30a and 30b, an ENTER key 32, and a number of individual statistic keys 35. Display 20 is preferably a 2-line, 16-character liquid crystal display.

FIG. 2 is a flow diagram illustrating the operation of device 5 from the user's point of view. FIGS. 3A-E illustrate the screen display at various stages of such operation. Operation begins by the depression of ON key 27, at which point the initial or wakeup menu appears, as shown in FIG. 3A. The user is prompted to select a player or team from the use of alphabet keys 25. The user enters the first letters of the desired player's name, as shown in FIG. 3B, until the user feels that enough characters have been entered. The user then presses ENTER key 32, and if a player has been uniquely identified, the name will appear on the display, as shown in FIG. 3C. If no player has those characters as the first letters in his name, the closest name is displayed and the user may then use cursor keys 30a-b to scroll through the list of players until the desired player's name appears on the display.

The user then presses the desired one of statistic keys 35, whereupon the desired statistic appears on the display. Typical displays are shown in FIGS. 3D and 3E. In all cases, the upper line of the display contains the selected player's name while the second line of the display contains the desired statistical data. As the standard statistics are different for pitchers and batters, two sets of characters appear on some of the statistic keys. For example, one of the keys contains characters ERA for earned run average for a pitcher, and will provide that statistic for a pitcher. That key also contains the character H for hits in the event that the user desires that statistic for a batter. As seen in FIGS. 3D-E, the first two columns contain information related to year or lifetime, the third column contains the league of the player's team (N or A for National or American), the fifth and sixth columns contain an abbreviation of the player's team, and the eighth column distinguishes a pitcher from a batter by the presence of a P or B, respectively. The next several columns contain the desired statistic while the rightmost characters show the type of statistic (e.g. H for hits or ERA for earned run average).

Any additional statistics for a specific player may be obtained by pressing additional statistic keys in the appropriate sequence. Each statistic may be viewed for a specific year or for the cumulative statistics by the use of cursor keys 30a–b. If it is desired to obtain statistics for another player, the user need only enter the appropriate letters via alphabet keys 25, followed by pressing ENTER key 32.

Hardware Organization

FIG. 4A is a block diagram of electronic circuitry 40, which is located inside housing 10 (FIG. 1) and which is responsible for the operation of the device. The key elements of circuitry 40 are a CPU 42 and a data ROM 45 within which is stored the statistical database. Data ROM 45 is preferably implemented as a removable module so that the user can replace the module every year and thus have the latest statistics available.

CPU 42 includes an ALU 47, a program ROM 50, a random access memory 52, and an input/output unit 55. Program ROM 50 contains the program code for the operation of the unit while random access memory 52 is used to store temporary information required by ALU 47 during execution of the program. Input/output unit 55 is connected directly to the keyboard array (22, 25), and to display 20 through a display controller 57 and a display driver 58.

FIG. 4B is a block diagram illustrating the manner in which data ROM 45 is addressed. In accordance with known practice, CPU 42 is implemented with a microprocessor such as a Signetics 83C451, which is designed to support an external data space of 64 Kbytes. However, data ROM 45 is much larger than 64 Kbytes, thereby necessitating a special mechanism to allow access to a much larger data ROM. Conventional address and data lines are used for data retrieval from a 32-Kbyte data space. This 32-Kbyte window is adjusted by a windowing register 60 that contains the requisite additional address lines. An 8-bit window register will allow access to a contiguous data space of 2 Mbytes. This may be expanded or segmented by the use of an additional expand register 62. In this embodiment, eight expand lines are available allowing access to up to 16 Mbytes with the use of 16-Mbit ROM's or commensurately less overall data space with lower density ROM's. Window register 60 and expand register 62 reside at respective input/output port locations.

To use the windowing method, the program code must identify the correct window in the available data ROM address space and then load the desired window number into window register 60. The contents of the window are then mapped by the hardware as address lines A14–A21 which are then used as the high address bits with A0–A13 provided by the processor. The data lines are unaffected by this method.

An important requirement for this method is that the processor hardware must know when it is fetching code from program ROM 50 and when it is fetching data from data ROM 45. Status lines, which are provided on typical microprocessors must be decoded by external hardware to prevent false selection of external devices. In this embodiment, the control lines, read and write, are inactive for internal program code fetches although the address and data lines are active with the code fetch. These control lines are logically combined with the high address lines to prohibit the data ROM from responding to program ROM access. This is accomplished by external gates that exhibit an OR function to deactivate the data ROM enable.

The use of the expand function is similar to the window register in that it is selected and loaded as an input/output port location. Each of the signals, X0–X7 may then be used to select an external ROM in accordance with the description above.

Database and Software Organization

FIGS. 5A and 5B illustrate the organization of data within data ROM 45. The data is organized in large tabular structures wherein each player has a separate table composed of three different record types. These are the header record containing biographical data, yearly records containing an entire year's statistics, and a cumulative record for the player's professional career.

FIG. 5B shows the detailed organization of the database. The format of each record varies by type. For example, header records are 24 bytes in length, yearly records are 53 bytes in length for pitcher statistics and 48 bytes for batters, and cumulative records are fixed at 54 bytes.

The database containing the statistical information for all major league baseball players was created on a minicomputer. This information included limited biographical information on the players as well as the gathered basic statistical records. To achieve an acceptable compression of the data, the numerical part of the database was cleansed of spaces, commas, etc., leaving only the ASCII characters 30–39 Hex (corresponding to numbers 0–9). Each remaining character was then stored in BCD format (4 bits). This immediately reduced the entire database to one half its prior size without the loss of any data. Statistical results, that is numbers that could be computed from other numbers according to certain statistical rules and definitions, e.g. batting average, were removed from the database. Additional program code was created and stored in program ROM 50 to recompute these statistics as required for display.

The biographical information was processed to obtain the team affiliation of each player by year, his birth date, and the total number of years that he played in the major leagues. This information was organized into a fixed format, again the total number of ASCII characters was reduced, and the resultant characters mapped into a 6-bit representation. Team names were mapped into unique two character representations to further reduce the total number of characters.

The requisite decompression tables, which are contained in the program code, are:
 the BCD/ASCII expansion table;
 the 6-bit character/ASCII expansion table; and
 the team name expansion table.

The total compression achieved by the above procedure resulted in an overall reduction of 4.5 compared to the original uncompressed database.

FIG. 6 is a flowchart illustrating the operation of the program stored in program ROM 50. When ON key 27 is initially depressed, hardware forces the code to the wakeup state and CPU 42 performs the housekeeping tasks of internal initialization of registers and RAM, external initialization of the display, and setting a hardware POWER-OFF timer. The CPU then waits in a loop for a key depression. Should a keystroke not occur before the hardware timeout occurs, the power to the CPU is interrupted and further operation is suspended until the ON key is depressed.

When a key is detected, the hardware timer is initialized and the key type determined. ROM 52 contains a pointer to a table in data ROM 60 of the locations of all player header records that are embedded in the data. As the user presses alphabet keys to select a player, CPU 42, under the direction of the program stored in program ROM 50, queries the header records in data ROM 45. At each new key, the distance between the entered string of characters and the contents of the headers is computed by performing a proximity comparison. This comparison entails computing the Hamming distance between the entered word and the contents of the name list portion of the data base. The proximity distance allows the CPU to select the record for the player whose name most closely matches the entered character string. As additional alphabet keys are depressed, the choice of records is more precisely known and the pointer is adjusted accordingly. A representation for alphabetic characters is stored in the data ROM to minimize the time for performing the distance computation. This representation takes advantage of common misspellings and the similarity of certain letters when sounded.

When the ENTER key is pressed, the header record that is currently pointed to by the pointer is decoded and displayed. When a statistic key is depressed, the correct statistic is displayed in the format described above. The cursor keys, when detected, cause the CPU to scroll either header records or statistical records depending on whether a header or statistical record is currently open. The detection of the ON key will initiate a warm boot and a return to the wakeup state.

CONCLUSION

In summary, it can be seen that the present invention provides the baseball fan with instant access to a wide variety of statistical data. The device is convenient and easy to use.

While the above is a complete description of a preferred embodiment of the invention, various modifications, alternative constructions, and equivalents may be used. Therefore, the above description should not be taken as limiting the scope of the invention, which is defined by the appended claims.

We claim:

1. A hand-held portable electronic apparatus for providing a user with baseball information on demand, comprising:
    a keyboard having a set of alphabet keys, an ENTER key, at least one cursor key, and a plurality of statistic keys;
    means for storing a compressed database comprising historical and statistical data for major league baseball players and teams, said database including for each player a header record and cumulative and yearly statistical records;
    a display device for providing a visual display to allow the user to view selected data; and
    a programmed microcomputer having
        means responsive to a sequence of alphabet keys for creating a pointer to the closest header record,
        means responsive to said ENTER key for causing the header information pointed to by said pointer to be displayed,
        means responsive to said cursor keys and operable when said header information is being displayed for displaying neighboring header information,
        means responsive to said statistic keys and operable when header information is being displayed for displaying a statistical record, and
        means responsive to said cursor keys and operable when a statistic is being displayed for displaying the same statistic for additional years.

2. The apparatus of claim 1 wherein said means for storing comprises a removable module containing a solid state read only memory.

3. A hand-held portable electronic apparatus for providing a user with sports information on demand, comprising:
    a keyboard having a set of alphabet keys, an ENTER key, at least one cursor key, and a plurality of statistic keys;
    means for storing a compressed database comprising historical and statistical data for major league players and teams, said database including for each player a header record and cumulative and yearly statistical records;
    a display device for providing a visual display to allow the user to view selected data; and
    a programmed microcomputer having
        means responsive to a sequence of alphabet keys for creating a pointer to the closest header record,
        means responsive to said ENTER key for causing the header information pointed to by said pointer to be displayed,
        means responsive to said cursor keys and operable when said header information is being displayed for displaying neighboring header information,
        means responsive to said statistic keys and operable when header information is being displayed for displaying a statistical record, and
        means responsive to said cursor keys and operable when a statistic is being displayed for displaying the same statistic for additional years.

4. The apparatus of claim 3 wherein said means for storing comprises a removable module containing a solid-state read-only memory.

* * * * *

UNITED STATES PATENT AND TRADEMARK OFFICE
CERTIFICATE OF CORRECTION

PATENT NO.  : 4,890,229

DATED       : December 26, 1989

INVENTOR(S) : Paul J. Rudnick et al.

It is certified that error appears in the above-identified patent and that said Letters Patent is hereby corrected as shown below:

In the cover sheet, the following names should be added to the list of inventors:

--Paul M. Toldalagi, Danville, Calif. and Harlan Neff, Castro Valley, Calif.--

Signed and Sealed this

Thirteenth Day of November, 1990

Attest:

HARRY F. MANBECK, JR.

*Attesting Officer*          *Commissioner of Patents and Trademarks*